(12) United States Patent
Eschleman et al.

(10) Patent No.: US 7,733,615 B2
(45) Date of Patent: Jun. 8, 2010

(54) DYNAMIC BRAKING LOAD ANALYZER

(75) Inventors: Joseph S. Eschleman, Covington, KY (US); Thomas Yingling, Batavia, OH (US); Michael Crowe, Fort Mitchell, KY (US)

(73) Assignee: Powerohm Resistors, Inc., Katy, TX (US)

( * ) Notice: Subject to any disclaimer, the term of this patent is extended or adjusted under 35 U.S.C. 154(b) by 232 days.

(21) Appl. No.: 12/112,363

(22) Filed: Apr. 30, 2008

(65) Prior Publication Data
US 2008/0265813 A1 Oct. 30, 2008

Related U.S. Application Data

(60) Provisional application No. 60/914,969, filed on Apr. 30, 2007.

(51) Int. Cl.
H02H 5/04 (2006.01)

(52) U.S. Cl. .............................. 361/23; 361/25; 361/1; 361/103; 318/471; 318/473; 318/371; 318/759; 374/100; 374/114; 323/352; 323/353; 323/354

(58) Field of Classification Search ................ 318/432, 318/471, 473, 759, 371; 361/1, 23, 25, 103; 323/352, 353, 354; 374/100, 114
See application file for complete search history.

(56) References Cited

U.S. PATENT DOCUMENTS

| | | | | |
|---|---|---|---|---|
| 4,093,900 A | * | 6/1978 | Plunkett | 318/370 |
| 6,262,555 B1 | * | 7/2001 | Hammond et al. | 318/759 |
| 6,373,207 B1 | * | 4/2002 | Yablonovitch | 318/362 |
| 6,417,577 B1 | * | 7/2002 | Grewe et al. | 290/40 C |
| 6,417,644 B2 | * | 7/2002 | Hammond et al. | 318/759 |
| 6,577,483 B1 | * | 6/2003 | Steicher et al. | 361/90 |
| 7,312,593 B1 | * | 12/2007 | Streicher et al. | 318/473 |
| 7,315,144 B2 | * | 1/2008 | Imaie et al. | 318/380 |

* cited by examiner

*Primary Examiner*—Rita Leykin
(74) *Attorney, Agent, or Firm*—John A. Miller; Miller IP Group, PLC

(57) ABSTRACT

A dynamic braking load analyzer that determines the proper resistance value for a dynamic braking load resistor to be used in combination with a variable frequency drive or servo-drive to accommodate the power dissipated from an induction motor when it is being reduced in speed. The analyzer includes a resistor bank having a plurality of resistors electrically coupled in parallel. Switches are provided between the resistors, and a resistor selector switch determines which resistors are switched into the resistor bank circuit. A heat sensing resistor in the resistor bank measures the heat generated by the resistors and provides a signal that is read by a heat meter. The combination of the temperature measurement and the resistance of the resistors in the circuit gives the proper braking resistance value for the deceleration of the induction motor.

14 Claims, 2 Drawing Sheets

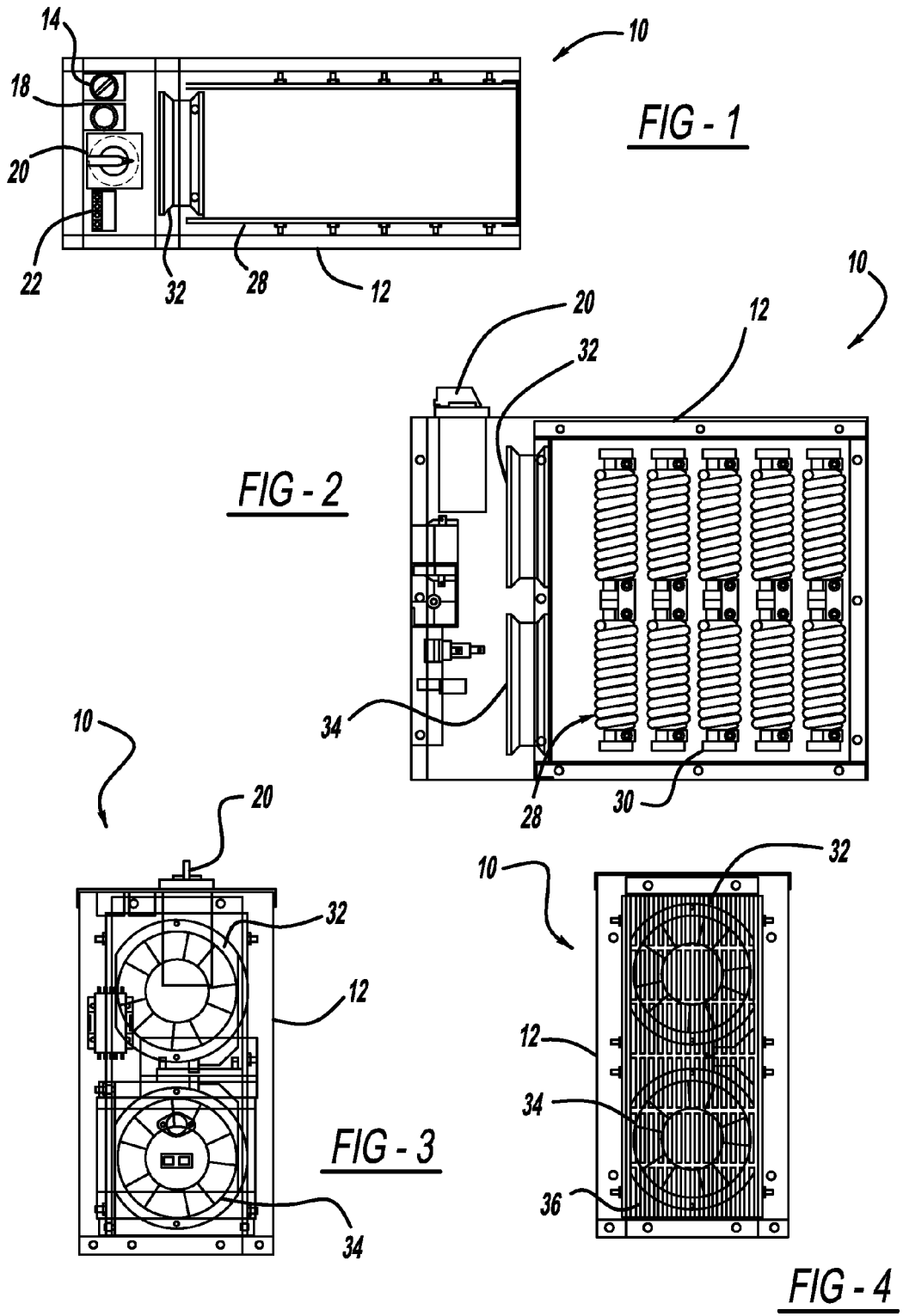

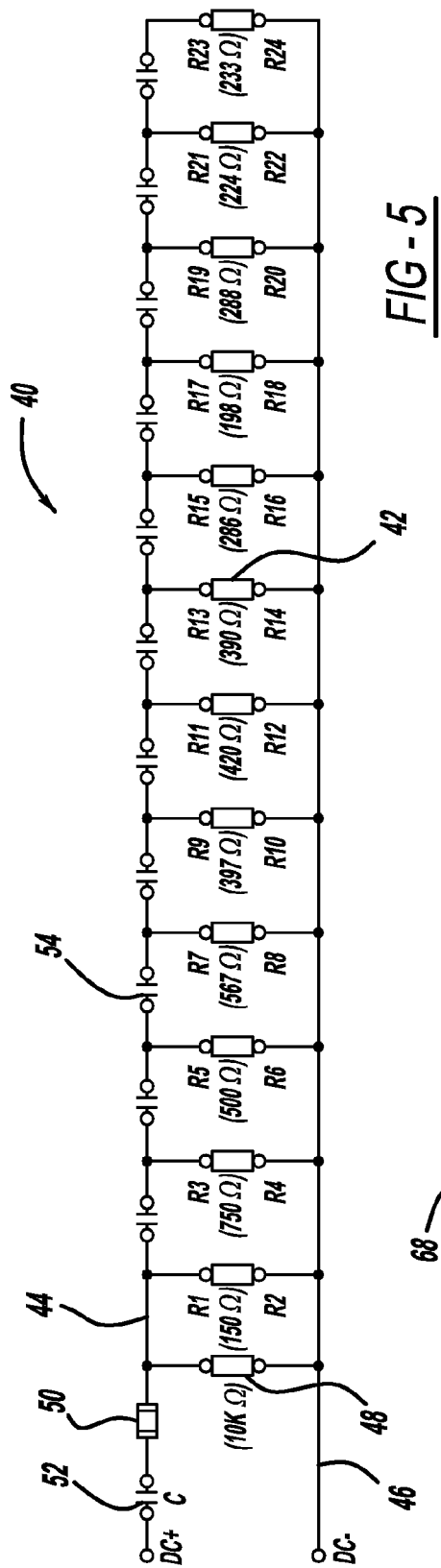

DYNAMIC BRAKING LOAD ANALYZER

CROSS-REFERENCE TO RELATED APPLICATIONS

This application claims the benefit of the priority date of U.S. Provisional Application No. 60/914,969, titled "Dynamic Braking Load Analyzer," filed Apr. 30, 2007.

BACKGROUND OF THE INVENTION

1. Field of the Invention

This invention relates generally to a dynamic braking load analyzer and, more particularly, to a dynamic braking load analyzer that selectively determines a braking resistive load that dissipates power from an induction motor that is decreasing in speed through a variable frequency drive or a servo-drive.

2. Discussion of the Related Art

Variable frequency drives (VFDs) are sometimes used with three-phase induction motors to provide speed control and energy savings for various industrial applications. For many of these applications, the motor may tend to over-speed when the motor is decelerated to a slower speed or completely brought to a stop. In this situation, the motor becomes a generator, where the generated voltage is directed back to the variable frequency drive. The variable frequency drive detects the generated voltage, and then acts to dissipate the power into some device, such as a resistor, or send it back to the original power source that provided the power for the motor. Sending it back to the original power source is typically an expensive option because it requires additional devices coupled to the power source for controlling the power.

A resistor used for this purpose is known as a dynamic braking load resistor. The size of the resistor required to dissipate the power generated from the deceleration of the motor would depend on how fast the motor was rotating, how fast the motor would be rotating at the decelerated speed and the time needed for reducing the speed of the motor.

Currently, the proper size of a dynamic braking load resistor is provided through selection charts and/or catalogues. If the desired criteria, such as voltage, horsepower, duty-cycle, torque, watts and ohms, are determined based on an VFD manual and the application using the drive, then the appropriate resistor may be selected. It is typically straightforward to determine the voltage and horsepower seen by the braking load resistor because these values are based on the drive and/or the motor. Thus, the challenge is to determine the torque, duty-cycle and watts of the motor so that the selected resistor is neither oversized, which has cost implications, nor undersized, which may cause the resistor to overheat and possibly fail.

Determining the values of torque, duty-cycle and watts is a function of knowing the application parameters. This determination includes all mechanical devices that are connected to the motor that provide mass, speed and velocity considerations. These load devices will both contribute and add to the mass and breaking power required, or will act to absorb the power dissipated.

SUMMARY OF THE INVENTION

In accordance with the teachings of the present invention, a dynamic braking load analyzer is disclosed that determines the proper resistance value for a dynamic braking load resistor to be used in combination with a variable frequency drive or a servo-drive to accommodate the power dissipated from an induction motor when it is being reduced in speed. The analyzer includes a resistor bank having a plurality of resistors electrically coupled in parallel. Switches are provided between the resistors, and a resistor selector switch determines which resistors are switched into the resistor bank circuit. A heat sensing resistor in the resistor bank measures the heat generated by the resistors and provides a signal that is read by a heat meter. The combination of the temperature measurement and the resistance of the resistors in the circuit gives the proper braking resistance value for the deceleration of the induction motor.

Additional features of the present invention will become apparent from the following description and appended claims, taken in conjunction with the accompanying drawings.

BRIEF DESCRIPTION OF THE DRAWINGS

FIG. 1 is a top view of a dynamic braking load analyzer, according to an embodiment of the present invention;

FIG. 2 is a side view of the dynamic braking load analyzer;

FIG. 3 is a front view of the dynamic braking load analyzer;

FIG. 4 is a back view of the dynamic braking load analyzer;

FIG. 5 is a schematic diagram of a resistor bank circuit within the dynamic braking load analyzer; and FIG. 6 is an input circuit for the dynamic braking load analyzer.

DETAILED DESCRIPTION OF THE EMBODIMENTS

The following discussion of the embodiments of the invention directed to a dynamic braking load analyzer for selecting the resistance value of a braking load resistor for dissipating power from a induction motor is merely exemplary in nature, and is in no way intended to limit the invention or its applications or uses.

FIG. 1 is a top plan view, FIG. 2 is a side plan view, FIG. 3 is a front plan view and FIG. 4 is a back plan view of a dynamic braking load analyzer (DBLA) 10, according to an embodiment of the present invention. The DBLA 10 is a device that facilitates the selection of a dynamic braking resistance for a variable frequency drive or servo-drive coupled to an induction motor. When the DBLA 10 is connected to the variable frequency drive, the DBLA 10 will absorb the energy of the drive when called on by a signal from the drive through a braking transistor. As will be discussed below, the DBLA 10 is a forced air resistive load that helps in the selection process of a permanent dynamic braking load resistor. When connected to the brake transistor of a variable frequency drive or the servo-drive, the DBLA 10 will determine the most optimum braking resistance value needed in both ohms and watts. Multiple DBLAs 10 can be connected in parallel to provide the loads for applications up to 200 or more horsepower.

The DBLA 10 includes an outer enclosure 12 that is powder coated and painted. Atop panel of the enclosure 12 includes a power switch 16, an on/off indicator light 18, a multiple position resistance selector switch 20 and a temperature meter 22. Plus and minus inputs (not shown) for connection to the variable frequency drive or the servo-drive are provided on a front panel of the DBLA 10. A resistor bank 28 of resistors 30 is mounted within the housing 12. A pair of fans 32 and 34 drives air through the enclosure 12 and a vent 36.

FIG. 5 is a schematic diagram of a resistor bank 40, representing the resistor bank 28, including a plurality of resistors 42 electrically coupled in parallel to a positive DC bus line 44 and a negative DC bus line 46. A switch 54 is provided between each pair of adjacent resistors 42. The number of the switches 54 that are closed is controlled by the position of the resistance selector switch 20 to provide which of the resistors 42 will be switched into the resistor bank circuit. A heat sensing resistor 48 is provided at the front of the resistor bank 40, and is always switched into the resistor bank circuit. A fuse 50 and a capacitor 52 are provided in the positive DC bus line 44. The DC bus lines 44 and 46 would be coupled to a braking transistor in the variable frequency drive (not shown) or to the servo-drive when in use. In this non-limiting embodiment, the resistor bank 40 includes thirteen of the resistors 42, each having a different value. The values of the resistors 42 are selected so that as the switches 54 are closed to switch in more of the resistors 42, an overall resistance of the resistor bank 40 is reduced as $$\frac{R_1 \cdot R_2}{R_1 + R_2},$$

and can provide for a wide range of different variable frequency drive or servo-drive applications. As will be appreciated by those skilled in the art, the specific resistive values identified herein are merely representative in that other applications may include a different number of resistors and different resistive values.

The selector switch 20 is a multi-positional switch that selectively switches each of the switches 54 into the resistor bank 40 from a left position to a right position as the switch 20 is rotated. For example, when the first of the switches 54 is closed, the resistors of 150 Ω and 750 Ω are electrically coupled to the resistor bank circuit in combination with the sensing resistor 48, and all of the other resistors 42 are switched out of the circuit. The combination of the resistance value provided by these three resistors sets a particular duty-cycle and horsepower for the resistor bank 40 for the particular application being run through the variable frequency drive or the servo-drive.

The heat given off by the resistor bank 40 is detected by the heat sensing resistor 48 as the induction motor decelerates and the power is dissipated by the resistor bank 40. The heat sensing resistor 48 will send a signal to the temperature meter 22 that will display a temperature measurement of the resistor bank 48. That temperature measurement in combination with the resistive value provided by the three resistors switched into the circuit will identify the proper braking resistance value needed for the particular application being run. For example, if only the first switch 54 is closed, and then the motor running the application is decelerated during normal operation, the temperature reading from the temperature meter 20 in combination with the position of the selector switch 20 can be used to look up the desired braking resistance for that application in a certain manual.

The horsepower of the variable frequency drive will determine how many of the switches 54 need to be switched into the circuit to give the proper reading by the meter 22. Each time another resistor 42 is switched into the circuit by closing one of the switches 54, the overall resistance of the circuit goes down, but its horsepower rating goes up. Therefore, by switching more resistors into the circuit, the wattage of the circuit goes up, and is capable of handling a higher horsepower from the variable frequency drive or the servo-drive. The initial position of the selector switch 20 to select the resistance value from the resistor bank 40 can be determined by the voltage rating of the variable frequency drive or servo-drive, particularly at what voltage the variable frequency drive or the servo-drive will shut off during the braking of the motor. Based on the drive manual, the operator of the DBLA 10 can select the desired resistance value for the resistor bank 40 from a few switch positions, and then determine which one provides the best resistance value by reading the temperature meter 22 based on the watts.

According to another embodiment of the present invention, an analyzer device can be provided that includes the heat sensing resistor 48 and the temperature meter 22, but does not include the resistor bank 40. The heat sensing resistor is electrically coupled across the DC bus lines. In this embodiment, the analyzer would be used to determine if an existing dynamic braking load resistor already provided in combination with a variable frequency drive or servo-drive was the proper size, was undersized or was oversized. By coupling the analyzer to the variable frequency drive or the servo-drive, the heat sensing resistor 48 and the meter 22 will show whether the proper resistance is being used for the application in the same manner as discussed above. Particularly, if the temperature sensing resistor 48 determines that the temperature of the dynamic braking load resistor in the variable frequency drive is too warm, then the analyzer will know that the braking load resistor has a resistive value that is too small.

FIG. 6 is a schematic diagram of an input circuit 60 associated with the DBLA 10. The input circuit 60 includes AC input lines 62 and 64 and an on/off switch 66. Further, various lights are shown in the circuit, such as an on/off light 70, a start light 72, a red light 74 and a green light 76. The cooling fans 32 and 34 are shown by fan elements 78 and 80.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A dynamic braking load analyzer for determining a braking resistance value for a variable frequency drive or servo-drive, said analyzer comprising:

a positive bus line and a negative bus line operable to be electrically coupled to the variable frequency drive;

a resistor bank including a plurality of resistors electrically coupled in parallel to the positive line and the negative line, said resistor bank further including a plurality of resistor switches electrically coupled between the resistors in the resistor bank for selectively switching the resistors into a resistor circuit;

a multi-position selector switch for selectively closing the resistor switches so as to determine which of the resistors will be switched into the resistor circuit and be electrically coupled to the variable frequency drive;

a temperature sensing device for sensing the temperature of the resistor bank; and a temperature meter for reading the temperature of the temperature sensing device, wherein the selector switch is positioned to change the resistance value of the resistor circuit and the temperature of the resistor circuit so as to identify the proper resistance value for providing dynamic braking of the variable frequency drive or servo-drive.

2. The analyzer according to claim 1 wherein the temperature sensing device is a temperature sensing resistor electrically coupled to the positive line and the negative line in parallel with the resistors in the resistor bank.

3. The analyzer according to claim 1 wherein the analyzer is a stand-alone unit that can be selectively coupled and decoupled from the variable frequency drive or servo-drive.

4. The analyzer according to claim 1 wherein each resistor in the resistor bank has a different resistance value.

5. The analyzer according to claim 4 wherein the resistor bank includes twelve resistors.

6. The analyzer according to claim 1 wherein the number of resistors switched into the resistor circuit is determined by the horsepower of the variable frequency drive or servo-drive.

7. The analyzer according to claim 1 further comprising at least one fan for cooling the resistor bank.

8. A dynamic braking load analyzer for determining whether a dynamic braking load resistor has a resistive value that is proper for a variable frequency drive or servo-drive, said analyzer comprising:
- a positive bus line and a negative bus line operable to be electrically coupled to the variable frequency drive;
- a temperature sensing device for sensing the temperature of the dynamic braking load resistor; and
- a temperature meter for reading the temperature of the sensing device, said temperature meter providing a temperature reading that identifies whether the dynamic braking load resistor is too hot to determine whether the braking load resistor has a resistive value that is too small for its application.

9. The analyzer according to claim 8 wherein the temperature sensing device is a temperature sensing resistor electrically coupled to the positive line and the negative line.

10. A dynamic braking load analyzer for determining a braking resistance value for a variable frequency drive or a servo-drive, said analyzer comprising:
- a positive bus line and a negative bus line operable to be selectively electrically coupled to the variable frequency driver;
- a resistor bank including a plurality of resistors electrically coupled in parallel to the positive line and the negative line, said resistor bank further including a plurality of resistor switches electrically coupled between the resistors in the resistor bank for selectively switching the resistors into the resistor circuit;
- a multi-position selector switch for selectively closing the resistor switches so as to determine which of the resistors will be switched into a resistor circuit and be electrically coupled to the variable frequency drive;
- a temperature sensing resistor electrically coupled to the positive line and the negative line in parallel with the resistors in the resistor bank; and
- a temperature meter for reading the temperature of the temperature sensing resistor, wherein the selector switch is positioned to change the resistance value of the resistor circuit and the temperature of the resistor circuit so as to identify the proper resistance value for providing dynamic braking of the variable frequency drive or servo-drive.

11. The analyzer according to claim 10 wherein each resistor in the resistor bank has a different resistance value.

12. The analyzer according to claim 11 wherein the resistor bank includes twelve resistors.

13. The analyzer according to claim 10 wherein the number of resistors switched into the resistor circuit is determined by the horsepower of the variable frequency drive or servo-drive.

14. The analyzer according to claim 10 further comprising at least one fan for cooling the resistor bank.

* * * * *